United States Patent [19]
Takashima et al.

[11] Patent Number: 5,213,909
[45] Date of Patent: May 25, 1993

[54] INSULATED FUEL CELL

[75] Inventors: Sei Takashima, Hitachi; Keizou Ohtsuka, Katsuta; Toshiki Kahara, Ibaraki; Yasutaka Komatsu, Hitachi, all of Japan

[73] Assignee: Hitachi, Ltd., Tokyo, Japan

[21] Appl. No.: 872,410

[22] Filed: Apr. 23, 1992

[30] Foreign Application Priority Data

Apr. 23, 1991 [JP] Japan .................. 3-092029

[51] Int. Cl.⁵ .............. H01M 10/50; H01M 8/24; H01M 2/08
[52] U.S. Cl. ........................... 429/26; 429/35; 429/120
[58] Field of Search .............. 429/34, 26, 12, 35, 429/120

[56] References Cited

U.S. PATENT DOCUMENTS

| | | | |
|---|---|---|---|
| 4,415,413 | 11/1983 | Veber | 429/34 X |
| 4,719,157 | 1/1988 | Tsutsumi et al. | 429/34 |
| 5,116,696 | 5/1992 | Barp | 429/34 X |

FOREIGN PATENT DOCUMENTS 64-63277 3/1989 Japan .

Primary Examiner—John S. Maples
Attorney, Agent, or Firm—Antonelli, Terry, Stout & Kraus

[57] ABSTRACT

A fuel cell has a plurality of fuel cell sub-stacks each of which has cell bodies, at least one anode header and at least one cathode header and which are stacked to form a fuel cell stack body, and side thermal insulators which are provided on the side of the fuel cell stack body so as to keep the fuel cell sub-stacks warm and which are discrete from each other in the direction of stacking of the fuel cell sub-stacks, each of the plurality of side thermal insulators being independently supported.

9 Claims, 8 Drawing Sheets

INSULATED FUEL CELL

BACKGROUND OF THE INVENTION

The present invention relates to a fuel cell having side thermal insulators used as a thermal insulation mechanism for a fuel cell stack body and which can easily be attached thereto.

A stack body having fuel cell sub-stacks each comprising many cell bodies, i.e., comprising electrolytic plates, anodes, cathodes, separators and so on, generally has side thermal insulators provided on the side thereof, as disclosed in Japanese Patent Laid-Open No. 64-63277. For example, since the working temperatures of a phosphate fuel cell and a fused carbonate fuel cell are 200° C. and 650° C., respectively, the side thermal insulators function to efficiently keep the temperature of a fuel cell body. Particularly, in a fused carbonate fuel cell having a higher working temperature, the thermal insulators are frequently provided on the periphery of a cell stack body and installed in a fuel cell pressure vessel together with mechanical strengthening members such as clamps for the fuel cell.

As shown in FIG. 11, in the conventional fuel cells, the lowermost thermal insulator 50 is placed on a support member 51 placed at the bottom of a stack body 60, and the same thermal insulators 50 are successively stacked on the lowermost thermal insulator 50. The total weight of the insulators is thus supported by the support member 51. Gas supply and exhaust pipes 52, 53 are respectively provided at a plurality of positions of the cell stack body 60, and the pipes 52, 53 must be passed through the side thermal insulators. In addition, since the height of the whole fuel cell stack body 60 repeatedly expands and contracts during operation, the relative position between the pipes 52, 53 and the side thermal insulators 50 varies during operation. Before assembling the cell, a sufficient gap is thus provided in each of the portions of the thermal insulators, through which the pipes 52, 53 are respectively passed, in expectation of contraction of the cell during operation so as to prevent the interference between the pipes 52, 53 and the thermal insulators 50 even if the fuel cell body contracts.

It is thus necessary to previously confirm all portions of interference between the thermal insulators and the fuel cell body and to design the side thermal insulators each having dimensions which cause no interference therebetween. It is also necessary to assemble the fuel cell body in consideration of the procedure of combination with each of the passage portions of the insulators. In order to take the requirements into consideration, conventional side thermal insulators are respectively formed into small elements, which are stacked after a cell is assembled. Since many small elements are stacked, all the elements are not always stacked at the completely same position, and the stack structure is very likely to be unstable.

The height of a fuel cell is increased with an increase in the capacity thereof. The total height of the side thermal insulators for keeping the side of the cell warm is inevitably increased. In a high stacked cell, therefore, a large number of small elements must be stacked high, and high-precision design and careful stacking work are required.

The workload required for constructing the side thermal insulators is extremely large. For example, in the case of a fused carbonate fuel cell, the work of constructing thermal insulators takes about one day even in a cell stack body of a several tens-kW class, and the total workload taken for a large-capacity power plant comprising many cell stack bodies of a several hundreds-kW class installed therein is estimated to be as huge as several months or more. Particularly, in a power plant constructed near a seacoast, if the work of constructing the thermal insulators is performed outdoors, there are the problems that the work is affected by the weather, and that chlorides in air adversely affect the cell sub-stacks during the work of constructing the thermal insulators.

The thermal insulation structure completed as a result of an enormous workload also has the following problems: Since the structure of the side thermal insulators 50 comprising small elements stacked, as described above, there is the danger that when an earthquake occurs during operation of the cell, the thermal insulator assembly itself is disassembled. In addition, the relative relation between the cell side and the side thermal insulator side inevitably depends upon the assembly state of each of the cell stack bodies even if care is taken to design so as to prevent the interference between both sides. As a result, it cannot be said that the fuel cell is constantly operated in a stable state with reliability.

SUMMARY OF THE INVENTION

The present invention has been achieved for solving the above problems of the side thermal insulators of conventional fuel cells with respect to the enormous constructing workload, particularly, the workload in a site after the fuel cell body is installed, the possibility of the interference between the body of a cell structure and the side thermal insulators, non-uniformity in the degree of thermal insulation of cell sub-stacks, and the adverse effects of impurities in the atmosphere on the fuel cell body, which are caused during the construction of the thermal insulators.

It is an object of the present invention to provide a fuel cell comprising side thermal insulators which have a high and uniform level of reliability of heat insulation for respective fuel cell sub-stacks, which can easily be constructed, which are not affected by impurities in the atmosphere during the constructing work and which produce no interference with other cell structures.

In order to achieve the object, the present invention provides a highly stacked fuel cell comprising side thermal insulators having a basic structure which is based on the observation of the fact that a stacked fuel cell body is divided into a plurality of sub-stacks having the same structure and in which the side thermal insulators for the cell stack body are discrete on the basis of the sub-stack units so as to be respectively supported independently in correspondence with the sub-stack or sub-stacks.

Namely, the present invention provides a fuel cell comprising a plurality of fuel cell sub-stacks each having cell bodies, at least one anode gas header and at least one cathode gas header, and thermal insulators respectively provided on the sides of the fuel cell sub-stacks, wherein the side thermal insulators provided on the sides of the fuel cell sub-stacks are formed so as to be discrete at least in the stacking direction of the sub-stacks, and the total weight of the side thermal insulators is divided into at least two in the stacking direction so that each of the discrete thermal insulators is independently supported.

In a preferred form of the invention, the side thermal insulators are discrete in correspondence with each of the cell sub-stacks in the stacking direction so that the weight of each of the thermal insulators is supported by the corresponding cell sub-stack, and supporting means is provided on a gas header of each of the cell sub-stacks.

In another preferred form, each of the side thermal insulators may be supported by a gas pipe connected to the corresponding cell sub-stack or by a spring member interposed between each of the side thermal insulators and a position other than the corresponding cell sub-stack of the fuel cell stack body.

In still another preferred embodiment, some of the side thermal insulators are supported by support members provided on the cell sub-stacks and others thereof are supported by spring members each interposed between a portion other than the cell substacks and the side thermal insulators.

In this invention, since the side heat insulators are discrete from each other in correspondence with the sub-stack or sub-stacks, the sub-stacks of the cell stack body and the side thermal insulators make one-to-one correspondence so that the side thermal insulators can independently be supported by the cell sub-stacks. A change in the relative position between a side thermal insulator and the corresponding cell sub-stack can thus be limited to one cell sub-stack or sub-stacks regardless of the position of the side thermal insulator in the cell stack body. In the pipe passage portions of the side thermal insulators, the cell side and the thermal insulator side is thus have the same relation in all sub-stacks, and the reliability of prevention of interference with other structures can be improved. In addition, since the side thermal insulators can be fitted at the same time as the assembly of the cell sub-stacks in a factory, new works to be performed in an actual site such as a power plant site or the like can be minimized.

DESCRIPTION OF THE PREFERRED EMBODIMENTS

The present invention is described in detail below with reference to embodiments.

Figure 1:
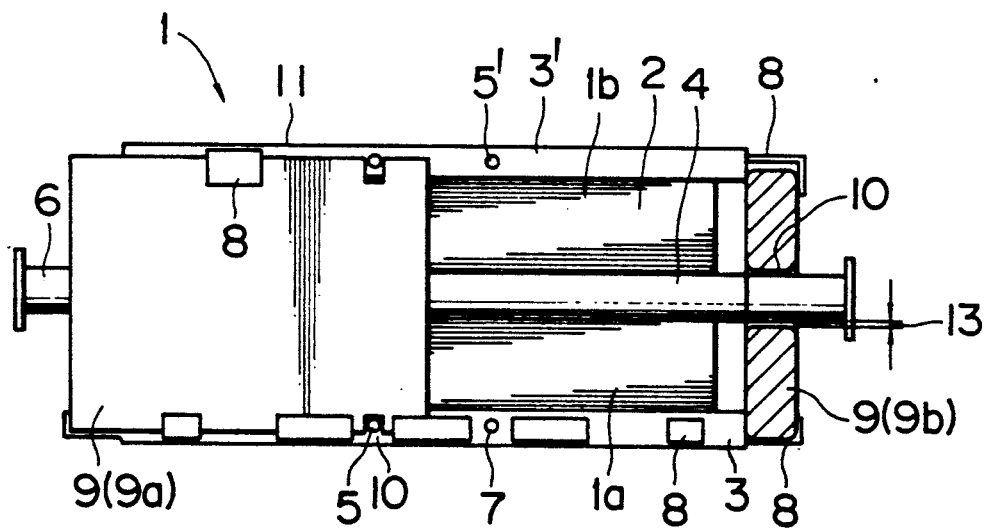
FIG. 1 is a partially sectional view of a fuel cell sub-stack which has side thermal insulators used in a fuel cell in accordance with the present invention.

FIG. 1 shows one of the four stacked cell sub-stacks each having a length of 1.5 m, a width of 1.5 m and a height of 1.2 m, which four sub-stacks constitutes a 50-kW fuel cell, in accordance with an embodiment of the present invention. As shown in the drawing, a cell sub-stack 1 has a stacked cell portion 2, anode headers 3, 3' and a cathode header 4. In the anode headers 3, 3' are respectively provided anode pipes 5, 5' for supplying and exhausting fuel gas to and from the headers. Similarly, in the cathode header 4 is provided a cathode pipe 6 for supplying and exhausting oxidizer gas to and from the cathode header 4. Cell sub-stack suspension fittings 7 for carrying the sub-stacks assembled are provided on the cell sub-stack 1.

In this embodiment, since the anode header 3 was placed at the lowermost portion of the cell sub-stack 1, thermal insulator support fittings 8 were provided on the anode headers 3, 3' so that side thermal insulators 9 made of a porous alumina plate were attached to the thermal insulator supporting fittings 8. The side thermal insulator is made and commercially sold by Nichias Ltd. by the name of "FIBERCAST", which insulator 35 mm thick, 800 mm in height, 850 mm wide, 1.02 g/cm$^3$ in density and 0.22 kcal/mh°C. (at 600° C.) in thermal conductivity. Such fitting means enabled the side thermal insulator 9 to be attached in contact with the sides of the upper and lower anode headers 3, 3'. In addition, in this embodiment, the anode pipes 5, 5', the cathode pipes 6 and the cell sub-stack suspension fitting 7 extend through the side thermal insulator 9. Thus, in the side thermal insulator 9, there had previously formed openings 10 at respective positions corresponding to the pipes. Each of the openings 10 was formed into a size with a clearance corresponding to the amount of expansion and contraction of the cell sub-stack 1 after operation so that any interference between the sub-stack 1 and the thermal insulator I did not occur.

Further, in this embodiment, since the side thermal insulator 9 was supported by the lower side of the cell sub-stack 1, the clearance for expansion and contraction was provided on the basis of the lower end of the side thermal insulator 9. For example, the opening 10 through which the cathode pipe 6 extends had a size to have clearance 13 corresponding to the amount of expansion and contraction of the lower half 1a of the sub-stack portion 1, and the clearance between the upper fitting 8 and the upper end surface of the side thermal insulator 9 was made to have a value corresponding to the amount of expansion and contraction of both of the half portions 1a, 1b of the sub-stack.

Figure 2:
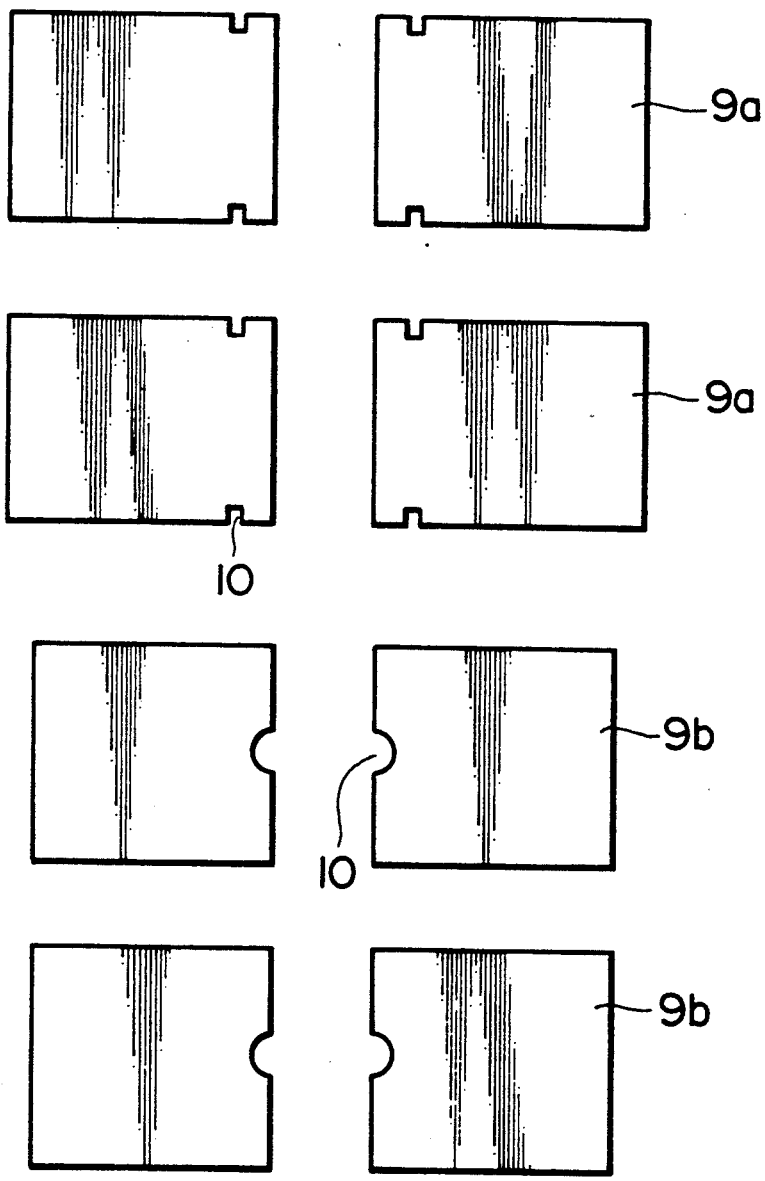
FIG. 2 is a drawing showing side thermal insulators used in a fuel cell embodying the present invention.

FIG. 2 shows the shapes of the side thermal insulators 9 in accordance with an embodiment of the invention. The side thermal insulators 9 had two kinds, i.e., an anode pipe-side thermal insulator 9a and a cathode pipe-side thermal insulator 9b, which were different in shapes. FIG. 2 shows the shapes of the anode pipe-side thermal insulator 9a and of the cathode pipe-side thermal insulator 9b, both of which were divided into two portions, in consideration of the easiness of assembly, however, the shapes need not to be divided into two portions. Particularly, even if the cathode pipe-side thermal insulator 9b is formed as one unit, it can easily be assembled.

Figure 3:
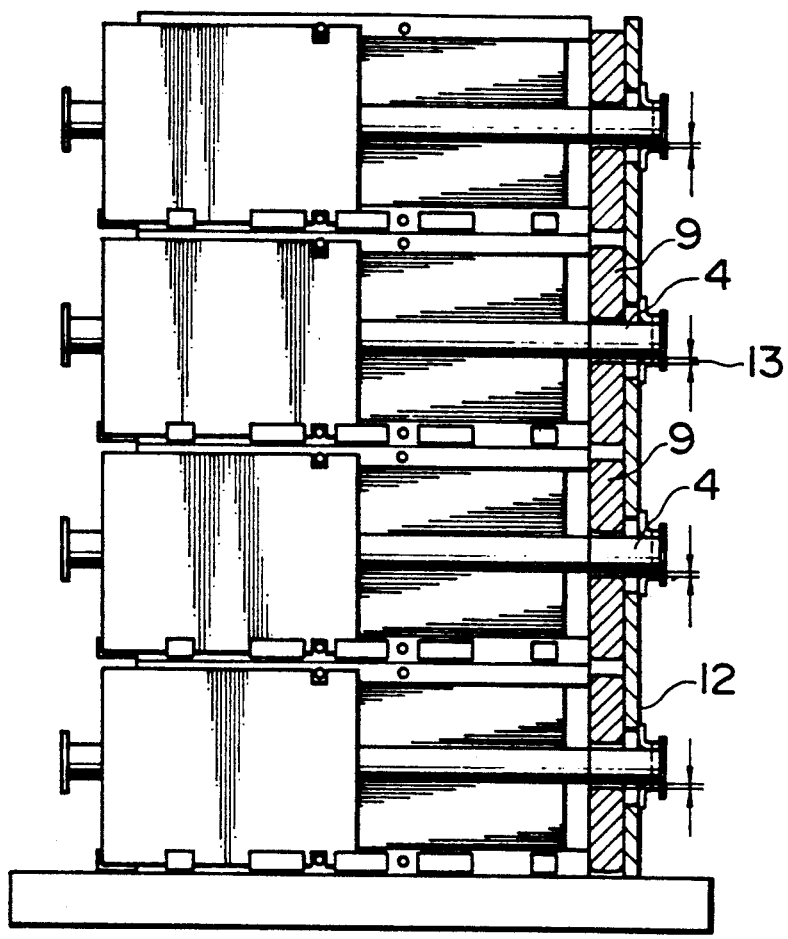
FIG. 3 is a partially sectional view of a stack structure which has a plurality of fuel cell sub-stacks having side thermal insulators used in a fuel cell in accordance with the present invention.

FIG. 3 shows a fuel cell stack body comprising a plurality of sub-stacks each having a side thermal insulator having the structure shown in FIG. 1, which were stacked for increasing the capacity thereof. Each sub-stack was 830 mm high before contraction and 805 mm high after contraction, while the side thermal insulator was 800 mm high so that a clearance of 2.5 mm was provided with respect to each of the halves of the insulator in a hight direction. After a plurality of the sub-stacks each provided with the side thermal insulator shown in FIG. 1 were stacked, outer heat insulators 12 which was made and sold by Nichias Ltd. by the name of "FINEFLEX BLANKET" were further fixed onto the outside of each of the side thermal insulator 9 in order to minimize the heat leaked from the gap between two side thermal insulator 9 adjacent to each other. The outer heat insulator was 1.0 g/cm$^3$ in specific gravity and 0.10 kcal/mh°C. (at 600° C.) in thermal conductivity, which was opened at the nozzle portion and was fixed on the insulator 12 by wire, the opened portion being covered by heat insulating sheet. As shown in FIG. 3, the clearance 13 between the side thermal insulator 9 and the cathode pipe 6 can be made identical value with respect to all of the sub-stacks.

The effects of the stack body shown in this embodiment are explained below.

(1) Required thermal insulators can be standardized in few types of thermal insulators. As shown in FIG. 2, only two types of thermal insulators including an anode-side insulator and an cathode-side insulator are required.

(2) The side thermal insulators 9 can be assembled in a factory in succession from the assembly of the sub-stacks.

(3) The side thermal insulators 9 can thus be assembled with high reliability, and the assembling of the thermal insulators can easily be controlled.

(4) The work of assembling the thermal insulators after the sub-stack bodies are stacked can be minimized, and the time required for the installation work in an actual site can be decreased. As described above in reference with the prior art, there is a fear that the period of time for the work of assembling the thermal insulators after the sub-stacks are stacked in a large-capacity plant such as a power plant or the like without employing the present invention needs several months. This work can be minimized by employing the invention.

(5) Since the shapes of the portions of the thermal insulators through which pipes and the like extend respectively can be standardized, the fear of interference between the pipes and each of the side thermal insulators 9 can be removed.

In addition to the above-described effects on the works, since each of the side thermal insulators 9 can be attached in contact with the sides of the upper and lower anode headers 3, 3', the invention further has the following effects:

(6) Each of the side thermal insulators provided serves as an impact absorber for the fuel cell body during transport, stacking and assembly and the like;

(7) Even if components such as alkali components of the electrolyte in a fused carbonate fuel cell or the like, to which attention should be paid, are scattered from the fuel cell body during the work such as transport, stacking, assembly or the like of the cell sub-stacks, the components are stayed in the thermal insulators, without scattering to the outside of the thermal insulators. The workers of assembly can work in a safe environment without anxiety; and (8) It is possible to prevent moisture, dust and other foreign materials from entering the cell stack body during the work of transport, stacking, assembly or the like of the cell sub-stacks.

The invention further the following characteristic effects:

(9) Since the side thermal insulators are respectively attached to the sub-stacks, an assembly of the side thermal insulators has a high level of assembly strength, and there is no fear of destruction of the side thermal insulators during an earthquake or the like;

(10) Since each of the sub-stacks is independently heat-insulated, a slight lateral shift of the position of each of the sub-stacks which may occur by an earthquake or the like after stacking, causes no serious affect on the heat insulation property.

(11) In relation to the effect (10), since each of the sub-stacks is independently heat-insulated, the precision of stacking of the sub-stacks has a large tolerance.

(12) Even if local combustion occurs due to the leak of fuel gas or local corrosion occurs due to the leak of the oxidizer, such a damage can be suppressed to the sub-stack in which the damage occurs.

Figure 4:
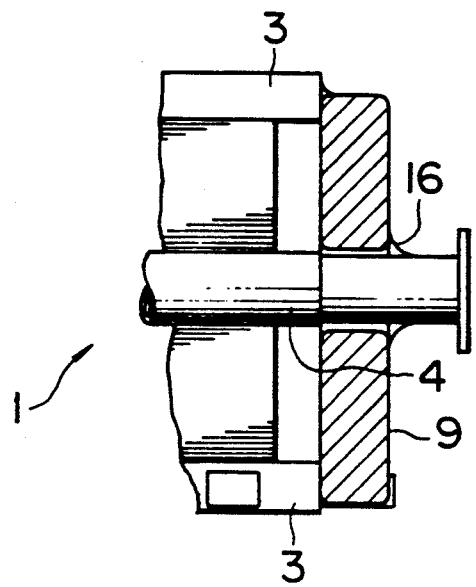
FIG. 4 is a partially sectional view of a fuel cell sub-stack having a side thermal insulator used in a fuel cell in accordance with another embodiment of the present invention.

Another embodiment of the present invention is described below. In the embodiment shown in FIG. 4, a gas sealing adhesive tape 16 was wound on the gap between a side thermal insulator 9 of a cell sub-stack 1 and a header 3' and the gap between the side thermal insulator 9 and a pipe 4. This can minimize moisture absorption by the electrolyte and adverse effects of impurities in the atmosphere on the cell sub-stack 1 during transport thereof. This also makes it unnecessary for transporting the cell sub-stack 1 to pack the cell sub-stack 1. The winding of such a sealing adhesive tape 16 can be made possible by employing the structure for supporting the side thermal insulator in accordance with the present invention.

Figure 5:
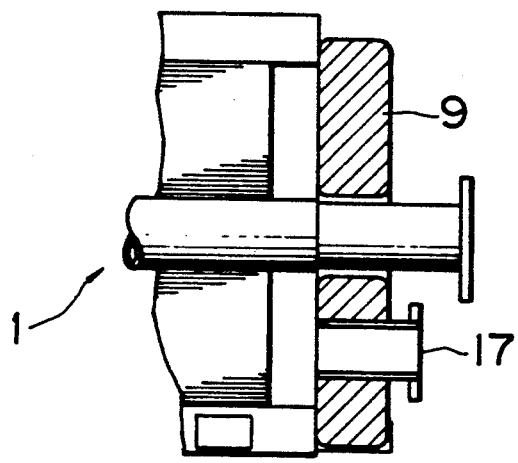
FIG. 5 is a partially sectional view of a fuel cell sub-stack having a side thermal insulator used in a fuel cell in accordance with still another embodiment of the present invention.

FIG. 5 shows still another embodiment of the present invention. In this embodiment, an inspection window 17 for observing the side of a cell sub-stack 1 was provided on a side thermal insulator 9. According to the construction of the side thermal insulator, it is possible to establish the same positional relative relation between the side thermal insulators 9 and the bodies of all cell sub-stacks 1, and it is possible to provide the inspection window 17 on the side thermal insulator 9 so that a specific portion required for inspecting the cell sub-stack 1 can be always observed regardless of the state of the cell expanded or contracted. In a conventional structure for supporting the side thermal insulator, even if an inspection window is provided on the thermal insulator, since the positions of the sub-stacks which allow observation through the window are remarkably different from each other because the cell expands and contracts, the window does not always serve to observe a predetermined position of the sub-stack 1.

Figure 6:
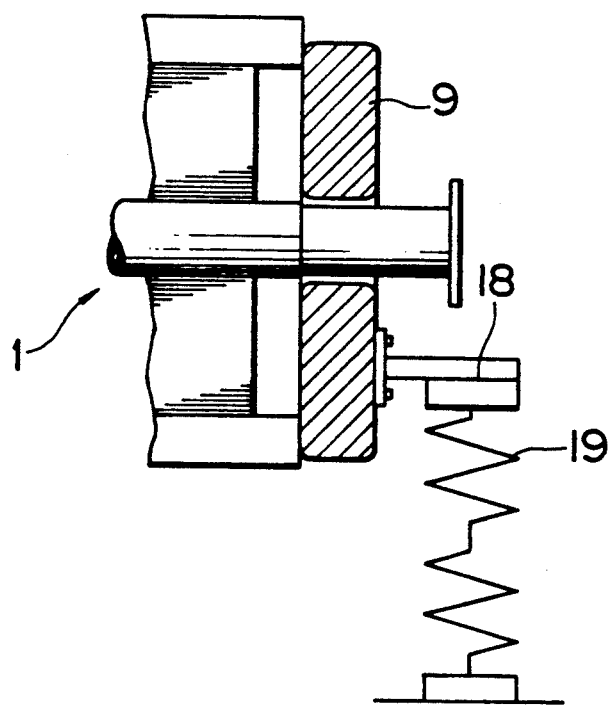
FIG. 6 is a partially sectional view of a fuel cell sub-stack having a side thermal insulator used in a fuel cell in accordance with a further embodiment of the present invention.

FIG. 6 shows a further embodiment of the present invention. In this embodiment, a thermal insulator support rod 18 and a support spring connected to the support rod 18 were provided on the side thermal insulator 9 so that the weight of all the side thermal insulators 9 was partially supported by a cell structure other than the cell sub-stack 1. The cell sub-stack 1 is generally sealed by applying a clamping load to the upper and lower portions thereof in order to seal the gas in the sub-stack 1. However, the clamping pressure applied to the sub-stacks varies with position of the cell sub-stack by gravity. This embodiment minimizes the deviation of the clamping pressure by supporting the side thermal insulator 9 through the sub-stack 1.

Figure 7:
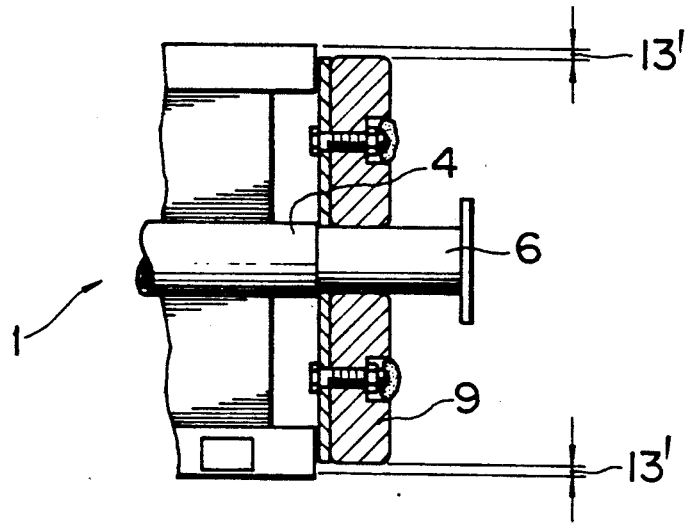
FIG. 7 is a partially sectional view of a fuel cell sub-stack having a side thermal insulator used in a fuel cell in accordance with a still further embodiment of the present invention.

FIG. 7 shows a still further embodiment of the present invention. In this embodiment, the cathode header side thermal insulator 9 was secured to a steel plate by bolts and nuts which steel plate was fixed to the cathode pipe 6 extended from the cathode header 4, and a clearance 13' for expansion and contraction of the cell was provided at the upper and lower end portions of the side thermal insulator 9, as shown in FIG. 7, the end of which bolt was covered by blankets for minimizing the dispersion of heat. In the embodiment, the support fitting 8 for the thermal insulator 9 need not be provided, thereby simplifying the structure.

Figure 8:
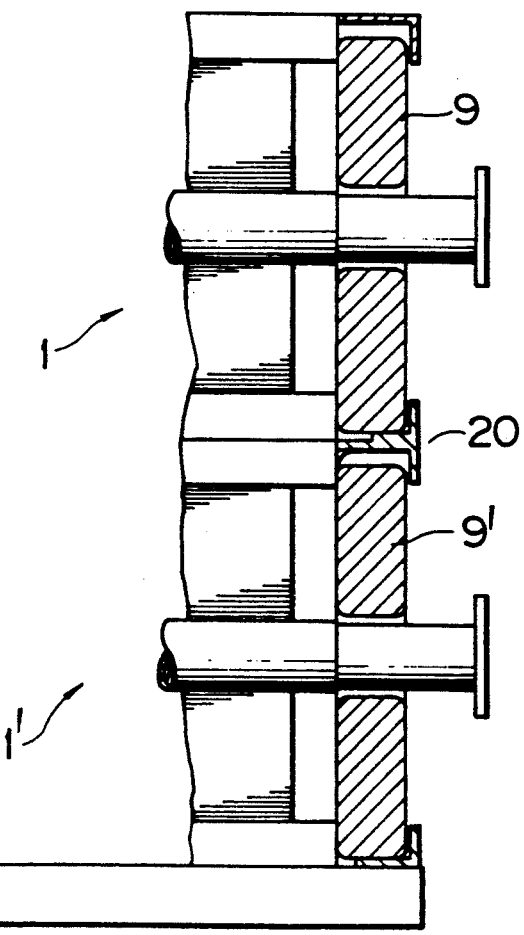
FIG. 8 is a partially sectional view of fuel cell sub-stacks having side thermal insulators used in a fuel cell in accordance with another embodiment of the present invention.

FIG. 8 shows another embodiment of the present invention. In this embodiment, the lower end of a side thermal insulator 9 corresponding to a cell sub-stack 1 was supported by an upper sub-stack side support fitting 20 secured to a sub-stack 1' below the sub-stack 1. The sub-stacks 1 are able to be assembled, transported and installed by the same way as that in the first embodiment. However, after the side thermal insulator 9 was supported by the corresponding cell sub-stack 1 and then installed, the support fitting 8 of the side thermal insulator 9 of each of the cell sub-stacks 1 was removed, and the side thermal insulator 9 corresponding to an upper adjacent sub-stack was supported by the upper sub-stack side support fitting 20 separately provided. This support structure brings about the same effects as those obtained by the first embodiment.

Figure 9:
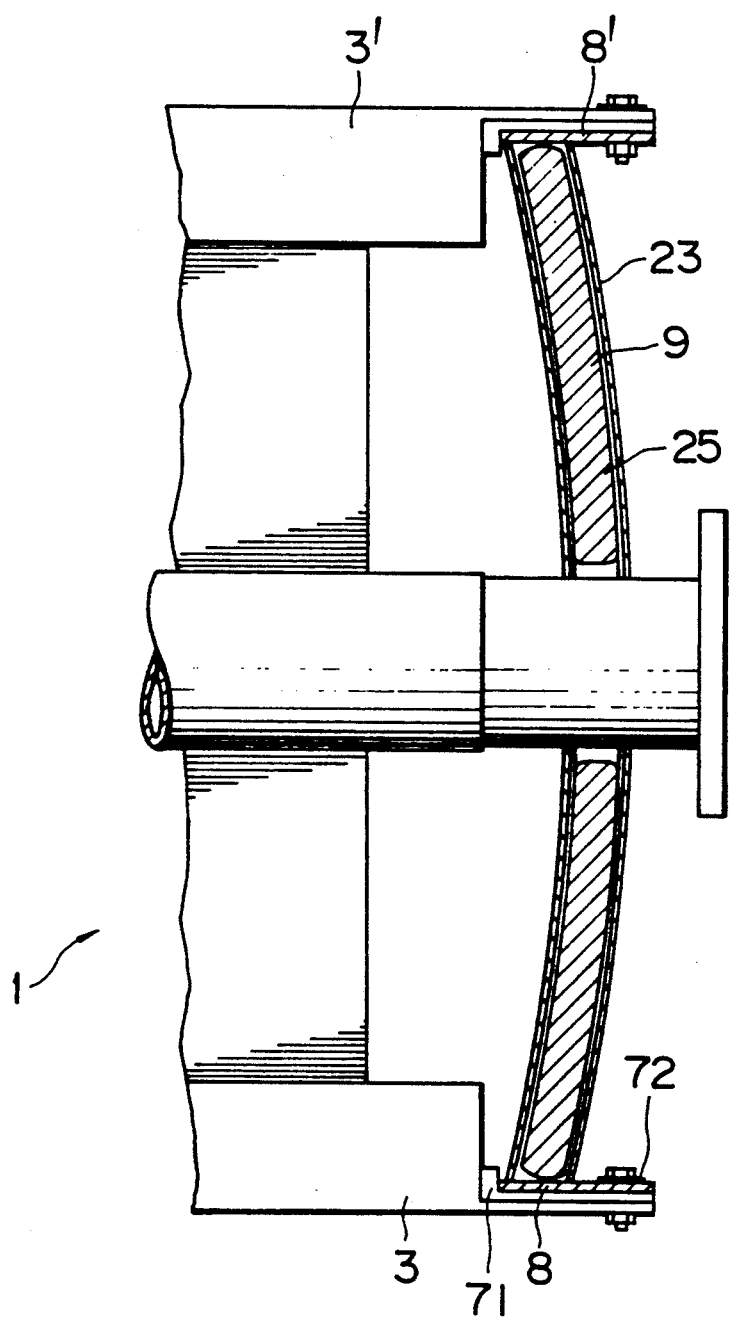
FIG. 9 is a partially sectional view of a fuel cell sub-stack having a side thermal insulator used in a fuel cell in accordance with a further embodiment of the present invention.

FIG. 9 shows another embodiment of the present invention. In this embodiment, a side thermal insulator 9 was formed to have a relatively thin and elastic body, and side thermal insulator support fittings 8, 8' were respectively provided on the upper and lower headers 3, 3' so that the side thermal insulator 9 was bridged in a curved state between the support fittings 8, 8'. In this embodiment, since the side thermal insulator 9 has elasticity, the expansion and contraction of each of the cell sub-stacks 1 are absorbed by the expansion and contraction of the corresponding side thermal insulator itself (by curvature in the case of the thermal insulator shown in the drawing). In the embodiment, as shown in FIG. 9, it was particularly effective that the side thermal insulator 9 was made to comprise a heat insulating member 5 and an elastic supporting member 23. The member 23 is a stainless steel strip of 2 mm in thickness and 1300 mm in bending radius, the member 25 being Fineflex Banket of 35 mm in thickness. In this embodiment, since there is no need for providing insulating members other than the side thermal insulator 9 provided on the cell sub-stack 1 on the periphery of the cell sub-stacks 1, this embodiment has the same effects obtained by the first embodiment and there is no need for the heat insulation working in an actual site. In addition, since the thermal insulator support members themselves are deformed together with the size variation of the cell sub-stack 1, no substantial gap is present between the side thermal insulator 9 and the corresponding sub-stack 1. This uniforms the quantities of heat dispersed from the side thermal insulators 9 and enables the formation of a structure of the side thermal insulators 9 with high reliability which prevents local heating of the mechanical structure near the side thermal insulators 9.

Figure 10:
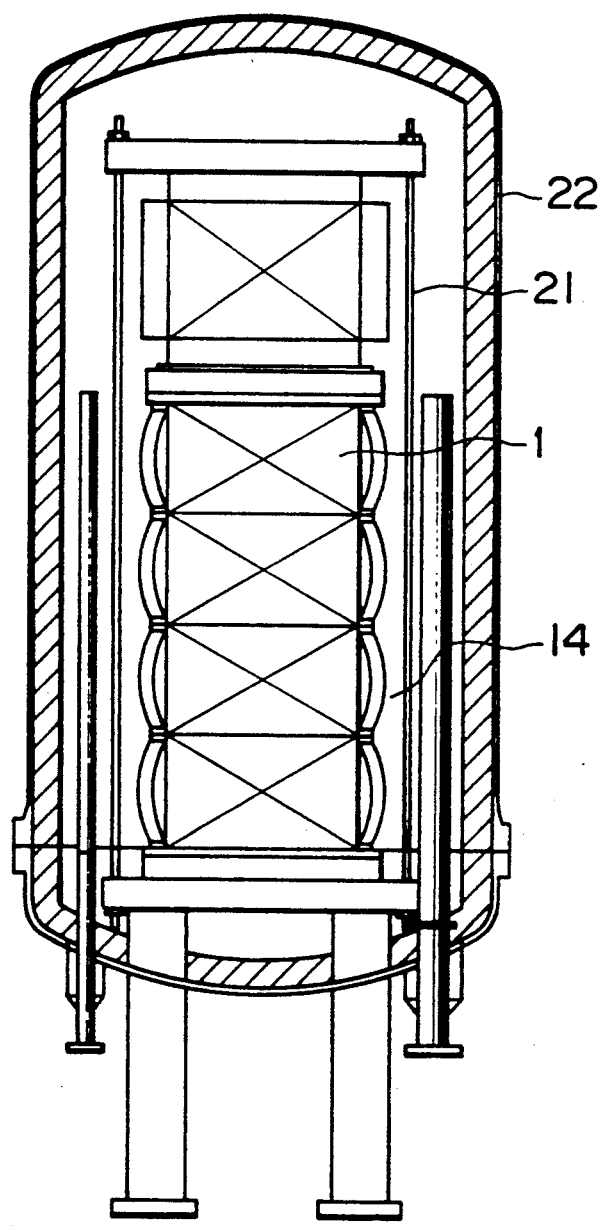
FIG. 10 is a partially sectional view showing a fuel cell in which fuel cell sub-stacks having side thermal insulators are installed in a pressure vessel.
Figure 11:
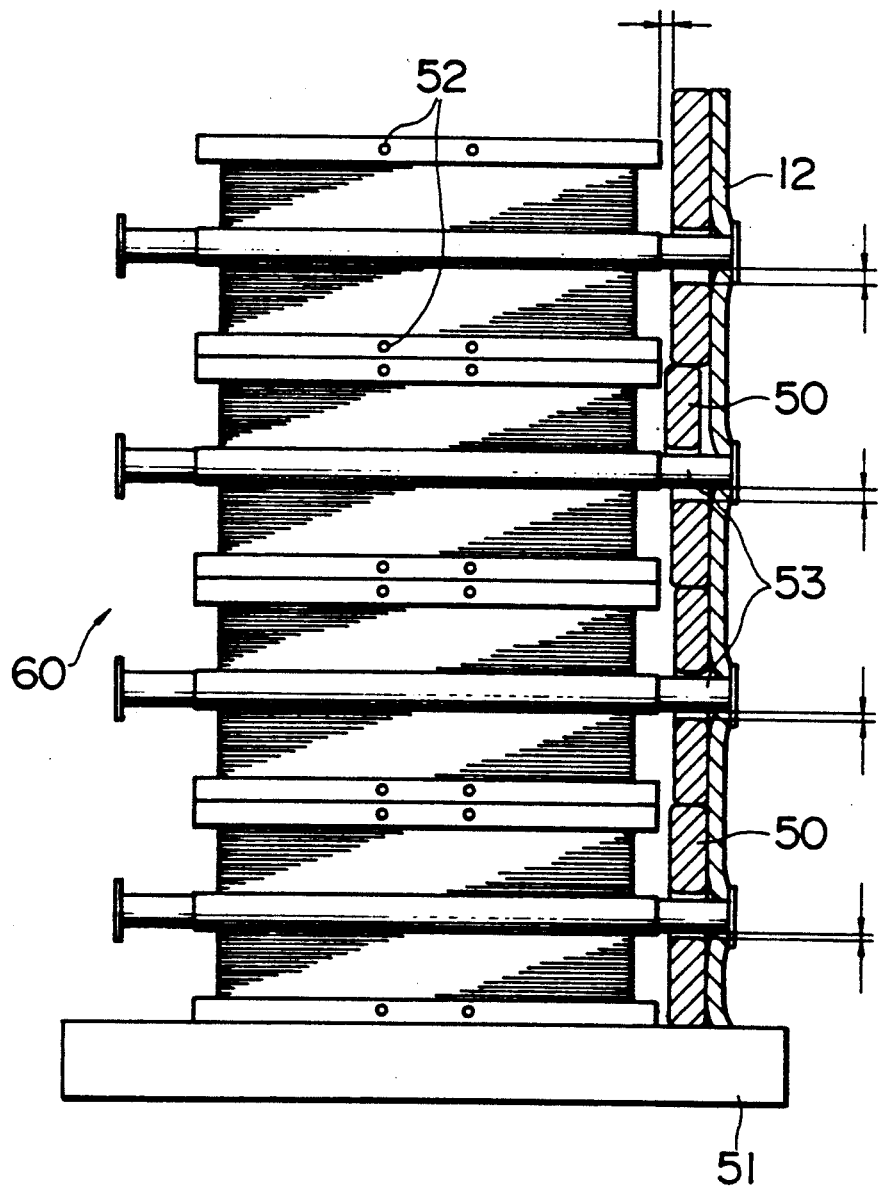
FIG. 11 is a drawing showing prior art fuel cell sub-stacks having a conventional thermal insulator supporting structure.

Each of the above-described preferred embodiments of the present invention shown in FIGS. 1 to 8 has a structure suitable for the case where the side thermal insulator is relatively thick so that the cell sub-stack 1 can be kept warm as completely as possible. On the other hand, as shown in FIG. 10, in some cases, the whole stack body including the side thermal insulators 9 is contained in a pressure vessel 22, and the atmospheric temperature of the space in the pressure vessel 22 is relatively high. In such a case, it is sufficient that the side thermal insulator 9 reduces the dispersion of the heat from the cell sub-stack 1 to an extent lower than those in the embodiments shown in FIGS. 1 to 8. It is particularly effective for such a case to employ the structure for supporting the side thermal insulators 9 in accordance with the present invention. This is because it can be said that it is useless to employ a conventional structure for supporting the side head insulators, in which prior art sufficient attention must be given to the through portions of pipes extended from the cell sub-stack 1 and which takes much time for installation, in spite of the small degree of heat insulation by the side thermal insulator 9. The structure of the side thermal insulator of the embodiment shown in FIG. 9 is particularly suitable for this case.

Although each of the above embodiments concerns a fuel cell, particularly a fused carbonate fuel cell of an internal manifold type, which has upper, medium and lower gas headers each provided on a cell sub-stack, the present invention can be applied to any types of fuel cells. It can easily understood that the present invention can be applied to an internal manifold type fuel cell and an external manifold type fuel cell. The cell sub-stack of the present invention includes a structure containing a modified plate used in a fused carbonate internal modification type cell.

The effects of the present invention are summarized below.

(1) Required thermal insulators can be standardized in few types of thermal insulators.
(2) The side thermal insulators 9 of the sub-stacks can be assembled in a factory in succession from the assembly of the sub-stacks.
(3) The side thermal insulators 9 can thus be assembled with high reliability, and the assembly state of the thermal insulators can easily be controlled.
(4) The work of assembling the thermal insulators after the sub-stack bodies are stacked can be made unnecessary or minimized, and the time required for the installation work in an actual site can be decreased.
(5) Since the shapes of the portions of the thermal insulators through which pies and the like extend can be standardized, the fear of interference between the pipes and each of the side thermal insulators 9 can be minimized.

(6) Each of the side thermal insulators provided serves as an impact absorber for the fuel cell body during transport, stacking and assembly and the like.

(7) Even if components such as alkali components of the electrolyte in a fused carbonate fuel cell or the like, to which attention should be paid, are scattered from the fuel cell body during the work such as transport, stacking, assembly or the like of the cell sub-stacks, the components are stayed in the thermal insulators, without scattering to the outside of the thermal insulators. The workers of assembly can work in a safe environment without anxiety.

(8) It is possible to prevent moisture, dust and other foreign materials from entering and being mixed in the cell stack body during the work of transport, stacking, assembly or the like of the cell sub-stacks.

(9) Since the side thermal insulators are respectively attached to the sub-stacks, an assembly of the side thermal insulators has a high level of strength, and there is no fear of destruction of the side thermal insulators during an earthquake or the like.

(10) The side thermal insulator has substantially the same effect on the heat insulation property.

(11) In relation to the effect (10), since each of the sub-stacks is kept warm, the precision of stacking of the sub-stacks has a large tolerance.

(12) Even if local combustion occurs due to the leak of fuel gas or local corrosion occurs due to the leak of the oxidizer, such a damage can be suppressed to the range of the sub-stack in which the damage occurs.

What is claimed is:

1. A fuel cell comprising:
a plurality of fuel cell sub-stacks each of which has cell bodies, at least one anode header and at least one cathode header, which sub-stacks are stacked to form a fuel cell stack body; and
side thermal insulators which are provided on the substantially whole side of said fuel cell stack body so as to keep said fuel cell sub-stacks warm and which are discrete from each other in the direction of stacking of said fuel cell sub-stacks;
each of said side thermal insulators being independently supported.

2. A fuel cell according to claim 1, wherein said side thermal insulators are discrete from each other in the stacking direction in correspondence with said respective cell sub-stacks, and the weight of each of said side thermal insulators is supported by the cell sub-stack or cell sub-stacks corresponding thereto.

3. A fuel cell according to claim 2, wherein support members are provided on a gas header of each of said cell sub-stacks so as to support the corresponding side thermal insulator.

4. A fuel cell according to claim 2, wherein support members are provided on a gas header of each of said cell sub-stacks so as to support the side thermal insulator corresponding to an upper adjacent cell sub-stack.

5. A fuel cell according to claim 2, wherein each of said side thermal insulators is supported by a gas pipe connected to the corresponding cell sub-stack.

6. A fuel cell according to claim 1, wherein said side thermal insulators are respectively supported by spring members each interposed between a portion other than said cell sub-stacks of said fuel cell stack body and said side thermal insulators.

7. A fuel cell according to claim 1, wherein some of said side thermal insulators are supported by support members provided on said cell sub-stacks and others thereof are supported by spring members each interposed between a portion other than said cell sub-stacks and said side thermal insulators.

8. A fuel cell according to claim 2, wherein each of said side thermal insulators has elasticity and is attached to said fuel cell sub-stack in an elastically deformed state.

9. A fuel cell according to claim 1, wherein a clearance provided between each of side thermal insulators and the corresponding cell sub-stack is sealed by a tape.

* * * * *